(12) United States Patent
Ikegami

(10) Patent No.: US 12,215,229 B2
(45) Date of Patent: Feb. 4, 2025

(54) LIP SEAL

(71) Applicant: EAGLE INDUSTRY CO., LTD., Tokyo (JP)

(72) Inventor: Naohisa Ikegami, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 25 days.

(21) Appl. No.: 17/483,783

(22) Filed: Sep. 23, 2021

(65) Prior Publication Data

US 2022/0275176 A1  Sep. 1, 2022

(30) Foreign Application Priority Data

Feb. 26, 2021 (JP) .................... 2021-030258
Jun. 3, 2021 (JP) .................... 2021-093800

(51) Int. Cl.

| | |
|---|---|
| *C08L 9/00* | (2006.01) |
| *C08K 3/04* | (2006.01) |
| *C08K 3/36* | (2006.01) |
| *F16J 15/3204* | (2016.01) |
| *F16J 15/3284* | (2016.01) |

(52) U.S. Cl.
CPC ...... *C08L 9/00* (2013.01); *C08K 3/04* (2013.01); *C08K 3/36* (2013.01); *F16J 15/3204* (2013.01); *F16J 15/3284* (2013.01)

(58) Field of Classification Search
CPC ...... C08L 9/00; C08K 3/04; C08K 3/36; F16J 15/3204; F16J 15/3284
USPC .................................................. 524/496
See application file for complete search history.

(56) References Cited

U.S. PATENT DOCUMENTS

| | | |
|---|---|---|
| 2014/0203520 A1 | 7/2014 | Yamanaka et al. |
| 2015/0197619 A1 | 7/2015 | Yoshimura |
| 2015/0354706 A1 | 12/2015 | Yamanaka et al. |

FOREIGN PATENT DOCUMENTS

| | | |
|---|---|---|
| CN | 104685271 A | 6/2015 |
| CN | 210623557 U | 5/2020 |
| JP | H02-058169 U | 4/1990 |
| JP | 2008-280366 A | 11/2008 |
| JP | 2016-156404 A | 9/2016 |
| WO | 2013/035697 A1 | 3/2013 |
| WO | 2014/024661 A1 | 2/2014 |
| WO | 2014/126240 A1 | 8/2014 |

OTHER PUBLICATIONS

European Search Report dated Feb. 24, 2022 (corresponding to EP 21197445.6).
Chinese Office Action dated Aug. 13, 2024 (corresponding to Chinese Application No. 202111080818.5).
Japanese Office Action dated Oct. 1, 2024 (corresponding to JP 2021-093800).

*Primary Examiner* — Ling Siu Choi
*Assistant Examiner* — Ronald Grinsted
(74) *Attorney, Agent, or Firm* — Harness, Dickey & Pierce, P.L.C.

(57) ABSTRACT

Lubricity of a lip seal material using hydrogenated nitrile rubber is improved. A rubber-like elastic lip seal which is fixed to a housing and slides with a shaft that rotates relatively with the housing, wherein the lip seal includes a rubber-like elastic body containing hydrogenated nitrile rubber, EPDM or fluoro rubber, a reinforcing filler material, and a non-reinforcing filler material having an aspect ratio in a range of 1 or more and 30 or less, and the lip seal contains 1 part by weight or more and 150 parts by weight or less of the reinforcing filler material and 5 parts by weight or more and 90 parts by weight or less the non-reinforcing filler material per 100 parts by weight of the rubber-like elastic body.

9 Claims, No Drawings

LIP SEAL

CROSS-REFERENCE TO RELATED APPLICATIONS

This application claims the benefit and priority of Japanese Application No. 2021-030258, filed Feb. 26, 2021 and Japanese Application No. 2021-093800, filed Jun. 3, 2021. The entire disclosures of each of the above applications are incorporated herein by reference.

FIELD

The present disclosure relates to a lip seal.

BACKGROUND ART

A sealing device which prevents a fluid sealed inside a housing of a water pump or the like from leaking is structured so that a lip part of a sealing member comes into sliding contact with a rotating shaft, and the sealing performance is improved as a result of the lip part being pressed against the rotating shaft by the pressure of the fluid.

As a rubber material to be used as the lip part of this kind of sealing device, Patent Document 1 discloses a rubber molded article obtained by kneading one or more types of rubber materials selected from nitrile rubber, hydrogenated nitrile rubber, fluoro rubber, silicone rubber and ethylene propylene rubber, and thermally expansible graphite, and subsequently vulcanizing and molding the kneaded material.

PRIOR ART DOCUMENTS

Patent Documents

[Patent Document 1] Japanese Unexamined Patent Application Publication No. 2008-280366

BACKGROUND AND SUMMARY

Problems to be Solved by the Disclosure

With a lip seal material using the rubber material disclosed in Patent Document 1, there were cases where the lubricity became insufficient during use. When the lubricity becomes insufficient, seizing occurs, the lip seal becomes damaged, and leakage may occur. Thus, an object of the present disclosure is to improve the lubricity of a lip seal material using hydrogenated nitrile rubber, EPDM and/or fluoro rubber among the foregoing rubber materials.

Means for Solving the Problems

As a result of intense study to achieve the foregoing object, the present inventors discovered that the lubricity of the rotating shaft and the lip seal can be improved by blending a certain amount of a non-reinforcing filler material having a specific shape and the foregoing object can be consequently achieved, and thereby completed the present disclosure.

In other words, the present disclosure provides a rubber-like elastic lip seal which is fixed to a housing and slides with a shaft that rotates relatively with the housing, wherein the lip seal includes a rubber-like elastic body containing hydrogenated nitrile rubber, EPDM and/or fluoro rubber, a reinforcing filler material, and a non-reinforcing filler material having an aspect ratio in a range of 1 or more and 30 or less, and the lip seal contains 1 part by weight or more and 150 parts by weight or less of the reinforcing filler material and 5 parts by weight or more and 90 parts by weight or less of the non-reinforcing filler material per 100 parts by weight of the rubber-like elastic body.

Effect of the Disclosure

According to the present disclosure, it is possible to provide a lip seal with improved lubricity in a lip seal material using hydrogenated nitrile rubber, EPDM and/or fluoro rubber. Moreover, in preferred forms, the various properties of a lip seal can also be improved.

MODE FOR CARRYING OUT THE DISCLOSURE

While the present disclosure is now explained in detail, the explanation of the following constituent elements is merely an example (representative example) of an embodiment of the present disclosure, and the present disclosure is not limited to these descriptions and may be variously modified within the scope of the subject matter of the present disclosure.

A lip seal according to an embodiment of the present disclosure is a rubber-like elastic lip seal which is fixed to a housing and slides with a shaft that rotates relatively with the housing, and includes a rubber-like elastic body containing hydrogenated nitrile rubber, EPDM and/or fluoro rubber, a reinforcing filler material, and a non-reinforcing filler material. The lip seal may contain only these components, or contain components other than these components. The present disclosure is now explained step by step.

Rubber-Like Elastic Body

A rubber-like elastic body contains hydrogenated nitrile rubber (HNBR), EPDM and/or fluoro rubber. An example of hydrogenated nitrile rubber is a type in which all or a part of the conjugated diene units of nitrile rubber (NBR) is hydrogenated, and while it is preferably butadiene-acrylonitrile copolymer rubber to which hydrogen has been added, there is no particular limitation to the type of hydrogenated nitrile rubber. Commercially available HNBR may be used, or HNBR produced using known methods may be used.

There is no particular limitation to EPDM so as long as it is ethylene-propylene rubber, and examples of EPDM include ethylene-propylene-dicyclopentadiene copolymer, ethylene-propylene-ethylidene norbornane copolymer, ethylene-propylene-1,4-hexadiene copolymer, ethylene-propylene-methylenenorbornene copolymer, and ethylene-propylene-methyltetrahydroindene copolymer, and one type, or a combination of two or more types, of the foregoing examples may be used.

An example of fluoro rubber is a rubber-like elastic body containing fluorine, and examples of fluoro rubber include vinylidene fluoride-propylene hexafluoride-tetrafluoroethylene copolymer, vinylidene fluoride-perfluorovinyl ether-tetrafluoroethylene copolymer, tetrafluoroethyleneperfluorovinyl ethercopolymer, vinylidene fluoride-propylene-tetrafluoroethylene copolymer, perfluorovinyl ether-ethylenetetrafluoroethylene copolymer, and vinylidene fluoride-propylene hexafluoridecopolymer, and one type, or a combination of two or more types, of the foregoing examples may be used.

Reinforcing Filler Material

A reinforcing filler material is a component capable of forming a chemical bond, such as a covalent bond or a hydrogen bond, between rubber components, and reinforcing the rubber strength. The reinforcing filler material is typically carbon black or silica, but is not limited thereto.

The content of a reinforcing filler material is preferably within a range of 1 part by weight or more and 150 parts by weight or less, and more preferably within a range of 30 parts by weight or more and 60 parts by weight or less, per 100 parts by weight of the rubber-like elastic body. By causing the content of the reinforcing filler material to fall within the foregoing range, the physical strength of the lip seal can be improved.

Non-Reinforcing Filler Material

A non-reinforcing filler material is a component capable of reinforcing the physical strength of the lip seal by existing as is in the rubber components without forming a chemical bond, such as a covalent bond or a hydrogen bond, between rubber components. The non-reinforcing filler material is typically silicate such as aluminum silicate, magnesium silicate or calcium silicate, carbon fiber, iron oxide, zinc oxide, titania, alumina, barium sulfate, calcium carbonate, talc, clay, or diatomaceous earth. Among the above, the non-reinforcing filler material preferably contains silicate and/or carbon fiber from the perspective of improving the lubricity. Moreover, the non-reinforcing filler material preferably contains zinc oxide for improving the compression set.

The non-reinforcing filler material preferably has an aspect ratio of 1 or more and 30 or less. The aspect ratio of the non-reinforcing filler material is preferably within the foregoing range so that concavities and convexities are formed on the seal surface and the surface roughness will fall within an appropriate range. The aspect ratio of the non-reinforcing filler material can be measured via microscopic observation. Specifically, the aspect ratios of a plurality of non-reinforcing filler materials can be calculated, and a mean value thereof may be adopted.

While there is no particular limitation in the mean diameter of the non-reinforcing filler material, the mean diameter of the non-reinforcing filler material is preferably within a range of 1 µm or more and 100 µm or less. By causing the mean diameter of the non-reinforcing filler material to fall within the foregoing range, the lubricity of the lip seal can be effectively improved, and favorable rubber performance and sealing performance can be exhibited. The term "mean diameter" as used herein refers to the mean particle size when the non-reinforcing filler material is made of particles, and refers to the mean long diameter when the non-reinforcing filler material is made of fiber. When the non-reinforcing filler material includes a filler material in particulate form and a filler material in fibrous form, the mean diameter thereof can be calculated based on the weighted average of the mean particle size of the particulate filler material and the mean long diameter of the fibrous filler material.

When the non-reinforcing filler material contains silicate, the mean particle size of silicate is preferably within a range of 10 µm or more and 30 µm or less. Note that the mean particle size can be measured through observation using an SEM.

When the non-reinforcing filler material contains carbon fiber, the wire diameter of carbon fiber is preferably within a range of 1 µm or more and 30 µm or less, the fiber length is preferably 1 µm or more and 100 µm or less, and the mean fiber length is preferably 1 µm or more and 50 µm or less.

Note that the wire diameter and the fiber length of carbon fiber can be measured using an SEM.

The content of a non-reinforcing filler material is preferably 5 parts by weight or more and 90 parts by weight or less, and more preferably 5 parts by weight or more and 40 parts by weight or less, per 100 parts by weight of the rubber-like elastic body. By causing the content of the non-reinforcing filler material to fall within the foregoing range, the lubricity of the lip seal can be effectively improved.

Plasticizer

As a plasticizer, those generally used in this technical field may be used, and examples of a plasticizer include a phthalate plasticizer, an adipate plasticizer, a sebacate plasticizer, and a trimellitate plasticizer, but are not limited thereto.

The content of a plasticizer is preferably more than 0 parts by weight and 15 parts by weight or less per 100 parts by weight of the rubber-like elastic body. By causing the content of the plasticizer to fall within the foregoing range, the lip seal can exhibit low-temperature endurance.

Antioxidant

As an antioxidant, those generally used in this technical field may be used, and examples of an antioxidant include an amine compound, a phenol compound, and an imidazole compound, but are not limited thereto.

The content of an antioxidant is preferably 0.5 parts by weight or more and 5 parts by weight or less, and more preferably 0.5 parts by weight or more and 3 parts by weight or less, per 100 parts by weight of the rubber-like elastic body. By causing the content of the antioxidant to fall within the foregoing range, the heat resistance of the lip seal can be improved.

Other Components

Other components that may be contained in the rubber composition may also be included to the extent that such inclusion will not inhibit the effects of the lip seal according to this embodiment. Examples of these other components include a processing aid, process oil, and acid acceptor.

Production of Lip Seal

Preparation of a rubber composition for molding a lip seal is performed by kneading the foregoing components contained in the lip seal with a kneading machine such as an intermixer, a kneader, or a banbury mixer, or an open roller. The prepared rubber composition is molded with a molding machine, and cross-linked by being heated.

Molding is performed using an injection molding machine or a compression molding machine, and as an example the rubber composition is cross-linked by being heated at a temperature atmosphere of 150° C. or higher and 200° C. or less for about 3 minutes or longer and 60 minutes or less. Secondary cross-linking may also be performed as needed.

Properties of Lip Seal

A roughness Ra of a sliding surface of the lip seal is preferably 0.01 to 10 µm. As a result of the lip seal falling within the foregoing range, concavities and convexities are moderately formed on the sliding surface when the lip seal is mounted, the fluid will flow into the concavities and convexities, and lubrication is thereby promoted. The roughness Ra is more preferably 0.01 to 1 μm. A favorable lubricated condition is thereby maintained, and leakage can be inhibited. Note that "Ra" represents the arithmetic mean roughness prescribed in JIS B 601.

Furthermore, in the lip seal, a ratio (tightening allowance ratio: A/B), which is a ratio obtained by dividing a tightening allowance (difference between an inner diameter dimension upon mounting the lip seal on a sliding part and an inner diameter dimension before mounting the lip seal on the sliding part) dimension (A) by an inner diameter dimension (B) before mounting the lip seal on the sliding part, is preferably 1% or more and 30% or less, and more preferably 10% or less. As a result of the lip seal falling within the foregoing range, the concavities and convexities on the sliding surface resulting from the surface roughness when the lip seal is mounted can be maintained, the fluid will moderately flow into the concave and convex impressions, and lubrication is thereby promoted. Note that the foregoing tightening allowance ratio is a value measured at room temperature.

Moreover, in the lip seal, a radial direction thickness of an innermost diameter part of the sliding part in a state before being mounted on the shaft is preferably 0.4 to 2 mm. It is thereby possible to maintain the strength of a sealed part while forming the lip seal into a prescribed shape, form a sealed part that will not be damaged upon sliding, and properly set the binding force of the lip seal. Thus, a favorable lubricated condition is thereby maintained, and leakage can be inhibited.

Furthermore, in the lip seal in a state of not yet being mounted on the shaft, an angle formed by an inner diameter surface which forms the sliding part and an apical surface of the lip seal in an axial cross section upon mounting the lip seal is preferably 90 to 120°. Consequently, even when the outer periphery of the sliding part is pressured by the sealed fluid or the like, the axial region of the sliding part will not increase excessively and a proper sliding state can be maintained. Moreover, the sealed fluid can more easily flow into the sliding surface, the sealed fluid will reach the concavo-convex part of the sliding surface, and a favorable lubricated condition can be maintained.

Another mode of the present disclosure is a method of producing a lip seal.

This mode is a production method of a lip seal including a step of blending a rubber-like elastic body containing hydrogenated nitrile rubber, EPDM or fluoro rubber, a reinforcing filler material, and a non-reinforcing filler material having an aspect ratio in a range of 1 or more and 30 or less in an amount of 1 part by weight or more and 150 parts by weight or less of the reinforcing filler material and 5 parts by weight or more and 90 parts by weight or less the non-reinforcing filler material per 100 parts by weight of the rubber-like elastic body, preferably additionally blending an antioxidant in a range of 0.5 parts by weight or more and 5 parts by weight or less, preferably additionally blending a plasticizer in a range of 15 parts by weight or less, and thereby preparing a rubber composition, and a step of molding the thus prepared rubber composition. This production method of a lip seal may additionally include a step of cross-linking the lip seal during molding or after molding.

EXAMPLES

While the present disclosure is now explained in further detail with reference to the following Examples, it goes without saying that the scope of the present disclosure is not limited to the descriptions of these Examples.

Example 1

The components indicated in Table 1 below were kneaded with a 10-inch roller, and a rubber composition was prepared. Next, the kneaded material was subject to primary cross-linking at 180° C. for 6 minutes, subsequently subject to oven vulcanization (secondary cross-linking) at 150° C. for 1 hour, and a sheet-like rubber sheet (thickness 2 mm) and a lip seal were vulcanized and molded, respectively.

TABLE 1

|  | Example 1 | Example 2 | Example 3 | Example 4 | Example 5 | Example 6 | Example 7 |
|---|---|---|---|---|---|---|---|
| Hydrogen-added NBR(Therban 3629) | 100 | 100 | 100 | 100 | 100 | — | — |
| EPDM | — | — | — | — | — | 100 | — |
| Fluoro rubber | — | — | — | — | — | — | 100 |
| Carbon Black (HTC #S) | 50 | 50 | 50 | 50 | 50 | 50 | 50 |
| Carbon Fiber(S2404N; Wire diameter of φ13 μm, mean long diameter of 40 μm) | 10 | 5 | 50 | — | — | 10 | 10 |
| Carbon Fiber(Wire diameter of φ1 μm, mean long diameter of 1 μm) | — | — | — | 10 | — | — | — |
| Carbon Fiber(Wire diameter of φ3 μm, mean long diameter of 78 μm) | — | — | — | — | 30 | — | — |
| Aluminum silicate(mean diameter of 10 μm) | 24 | — | 24 | 24 | 24 | 24 | 24 |
| Magnesium oxide(KYOWAMAG150) | 5 | — | 5 | 5 | 5 | 5 | 5 |
| Zinc oxide | 5 | — | 5 | 5 | 5 | 5 | 5 |
| Antioxidant(NOCRAC CD) | 3 | 3 | 3 | 3 | 3 | 3 | 3 |
| Plasticizer(ADKCIZER RS700) | 5 | 5 | 5 | 5 | 5 | 5 | 5 |
| Physical property evaluation | ○ | ○ | ○ | ○ | ○ | ○ | ○ |
| Torque test | ○ | ○ | ○ | ○ | ○ | ○ | ○ |
| Sealing properties | ○ | ○ | ○ | ○ | ○ | ○ | ○ |
| Heat aging resistance(%) | −17 | −19 | −20 | −16 | −17 | −17 | −16 |
| Surface roughness(μm) | 0.29 | 0.22 | 8.30 | 0.20 | 4.70 | 0.31 | 0.32 |

|  | Example 8 | Example 9 | Example 10 | Example 11 | Example 12 | Example 13 |
|---|---|---|---|---|---|---|
| Hydrogen-added NBR(Therban 3629) | 100 | 100 | 100 | 100 | 100 | 100 |
| EPDM | — | — | — | — | — | — |
| Fluoro rubber | — | — | — | — | — | — |

TABLE 1-continued

| | | | | | | |
|---|---|---|---|---|---|---|
| Carbon Black (HTC #S) | 50 | 50 | 1 | 150 | 50 | 50 |
| Carbon Fiber(S2404N; Wire diameter of φ13 μm, mean long diameter of 40 μm) | 10 | 10 | 10 | 10 | 10 | 10 |
| Carbon Fiber(Wire diameter of φ1 μm, mean long diameter of 1 μm) | — | — | — | — | — | — |
| Carbon Fiber(Wire diameter of φ3 μm, mean long diameter of 78 μm) | — | — | — | — | — | — |
| Aluminum silicate(mean diameter of 10 μm) | 24 | 24 | 24 | 24 | 24 | 24 |
| Magnesium oxide(KYOWAMAG150) | 5 | 5 | 5 | 5 | 5 | 5 |
| Zinc oxide | 5 | 5 | 5 | 5 | 5 | 5 |
| Antioxidant(NOCRAC CD) | 0.5 | 5 | 3 | 3 | 0.1 | 8 |
| Plasticizer(ADKCIZER RS700) | 5 | 5 | 5 | 5 | 5 | 5 |
| Physical property evaluation | ○ | ○ | ○ | ○ | ○ | Δ |
| Torque test | ○ | ○ | ○ | ○ | ○ | ○ |
| Sealing properties | ○ | ○ | ○ | ○ | ○ | ○ |
| Heat aging resistance(%) | −25 | −12 | −16 | −16 | −42 | −11 |
| Surface roughness(μm) | 0.28 | 0.33 | 0.45 | 0.20 | 0.32 | 0.35 |

Each of the following items were measured regarding the thus obtained cross-linked material. As the test piece, the sheet-like rubber was used for the physical property evaluation and heat aging resistance, and the lip seal was used for the torque test, sealing properties, and surface roughness. The results are shown in Table 1.

*Physical property evaluation: The elongation at break was measured based on JIS K6251 corresponding to ISO37, and those being 150% or more were evaluated as "○", those being less than 150% and 140% or more were evaluated as "Δ", and those being less than 140% were evaluated as "x"

*Torque test: With water as the sealed fluid, the torque was measured by rotating a shaft having a diameter of 15 mm at a rotating speed of 0 to 5000 rpm, and those having a lower torque in comparison to Comparative Example 1 were evaluated as "○", and those having an equal or greater torque in comparison to Comparative Example 1 were evaluated as "x"

*Sealing properties: With an LLC aqueous solution (concentration of 30 volume %) as the sealed fluid, a rotation test was performed under the conditions of 6000 rpm, 120° C., 0.15 MPa, and 50 hours and the leak rate (ml/hour) of the LLC aqueous solution was measured, and those having a leak rate of less than 0.2 ml/hour were evaluated as "○", and those having a leak rate of 0.2 ml/hour or more were evaluated as "x"

*Heat aging resistance: The elongation change after an air oven aging test at 150° C. for 70 hours was measured

*Surface roughness: The surface roughness Ra of the sliding surface of the lip seal was measured with a laser microscope Example 2

In Example 1, the amount of carbon fiber was changed to 5 parts by weight, a cross-linked material was obtained without blending aluminum silicate, magnesium oxide, and zinc oxide, and a test was performed using the thus obtained cross-linked material.

Example 3

In Example 1, the amount of carbon fiber was changed to 50 parts by weight, a cross-linked material was obtained, and a test was performed using the thus obtained cross-linked material.

Example 4

In Example 1, carbon fiber having a wire diameter of 13 μm and a mean fiber length of 40 μm was changed to an equivalent amount of carbon fiber having a wire diameter of 1 μm and a mean fiber length of 1 μm, a cross-linked material was obtained, and a test was performed using the thus obtained cross-linked material.

Example 5

In Example 1, carbon fiber having a wire diameter of 13 μm and a mean fiber length 40 μm was changed to 30 parts by weight of carbon fiber having a wire diameter of 3 μm and a mean fiber length of 78 μm, a cross-linked material was obtained, and a test was performed using the thus obtained cross-linked material.

Example 6

In Example 1, hydrogenated NBR was changed to an equivalent amount (100 parts by weight) of EPDM (EPT3045 manufactured by Mitsui Chemicals), a cross-linked material was obtained, and a test was performed using the thus obtained cross-linked material.

Example 7

In Example 1, hydrogenated NBR was changed to an equivalent amount (100 parts by weight) of fluoro rubber (DAI-EL G901 manufactured by Daikin Industries), a cross-linked material was obtained, and a test was performed using the thus obtained cross-linked material.

Example 8

In Example 1, the amount of antioxidant was changed to 0.5 parts by weight, a cross-linked material was obtained, and a test was performed using the thus obtained cross-linked material.

Example 9

In Example 1, the amount of antioxidant was changed to 5 parts by weight, a cross-linked material was obtained, and a test was performed using the thus obtained cross-linked material.

Example 10

In Example 1, the amount of carbon black was changed to 1 part by weight, a cross-linked material was obtained, and a test was performed using the thus obtained cross-linked material.

Example 11

In Example 1, the amount of carbon black was changed to 150 parts by weight, a cross-linked material was obtained, and a test was performed using the thus obtained cross-linked material.

Example 12

In Example 1, the amount of antioxidant was changed to 0.1 parts by weight, a cross-linked material was obtained, and a test was performed using the thus obtained cross-linked material.

Example 13

In Example 1, the amount of antioxidant was changed to 8 parts by weight, a cross-linked material was obtained, and a test was performed using the thus obtained cross-linked material.

Comparative Example 1

In Example 1, the amount of carbon fiber was changed to 1 part by weight, a cross-linked material was obtained without blending aluminum silicate, magnesium oxide, and zinc oxide, and a test was performed using the thus obtained cross-linked material. The results of the Comparative Examples are shown in Table 2.

Comparative Example 2

In Example 1, the amount of carbon fiber was changed to 70 parts by weight, a cross-linked material was obtained, and a test was performed using the thus obtained cross-linked material.

Comparative Example 3

In Example 1, carbon fiber having a wire diameter of 13 μm and a mean fiber length of 40 μm was changed to an equivalent amount of carbon fiber having a wire diameter of 1 μm and a mean fiber length of 60 μm, a cross-linked material was obtained, and a test was performed using the thus obtained cross-linked material.

Comparative Example 4

In Example 1, a cross-linked material was obtained without blending carbon black, and a test was performed using the thus obtained cross-linked material.

Comparative Example 5

In Example 1, the amount of carbon black was changed to 170 parts by weight, a cross-linked material was obtained, and a test was performed using the thus obtained cross-linked material.

TABLE 2

|  | Comparative Example 1 | Comparative Example 2 | Comparative Example 3 | Comparative Example 4 | Comparative Example 5 |
| --- | --- | --- | --- | --- | --- |
| Hydrogen-added NBR(Therban 3629) | 100 | 100 | 100 | 100 | 100 |
| EPDM | — | — | — | — | — |
| Fluoro rubber | — | — | — | — | — |
| Carbon Black (HTC #S) | 50 | 50 | 50 | — | 170 |
| Carbon Fiber(S2404N; Wire diameter of φ13 μm, mean long diameter of 40 μm) | 1 | 70 | — | 10 | 10 |
| Carbon Fiber(Wire diameter of φ1 μm, mean long diameter of 60 μm) | — | — | 10 | — | — |
| Aluminum silicate(mean diameter of 10 μm) | — | 24 | 24 | 24 | 24 |
| Magnesium oxide(KYOWAMAG150) | — | 5 | 5 | 5 | 5 |
| Zinc oxide | — | 5 | 5 | 5 | 5 |
| Antioxidant(NOCRAC CD) | 3 | 3 | 3 | 3 | 3 |
| Plasticizer(ADKCIZER RS700) | 5 | 5 | 5 | 5 | 5 |
| Physical property evaluation | ○ | x | x | x | ○ |
| Torque test | — | ○ | ○ | ○ | x |
| Sealing properties | ○ | ○ | ○ | ○ | ○ |
| Heat aging resistance(%) | -16 | -17 | -20 | -16 | -14 |
| Surface roughness(μm) | 0.15 | 30.00 | 42.00 | 0.32 | 0.18 |

What is claimed is:

1. A rubber lip seal which is fixed to a housing and slides with a shaft that rotates relatively with the housing, wherein:
   the lip seal comprises a rubber comprising hydrogenated nitrile rubber, ethylene propylene diene monomer rubber or fluoro rubber, a reinforcing filler material, and a non-reinforcing filler material having an aspect ratio in a range of 1 or more and 30 or less;
   the lip seal contains 1 part by weight or more and 150 parts by weight or less of the reinforcing filler material and 5 parts by weight or more and 90 parts by weight or less the non-reinforcing filler material per 100 parts by weight of the rubber; and
   a roughness Ra of a sliding surface of the lip seal is 0.01 to 0.45 μm.

2. The lip seal according to claim 1, wherein the lip seal additionally comprises an antioxidant in a range of 0.5 parts by weight or more and 5 parts by weight or less.

3. The lip seal according to claim 1, wherein the non-reinforcing filler material comprises carbon fiber and silicate.

4. The lip seal according to claim 1, wherein a mean diameter of the non-reinforcing filler material is 1 μm or more and 100 μm or less.

5. The lip seal according to claim 1, wherein the lip seal additionally comprises a plasticizer in a range of 15 parts by weight or less.

6. The lip seal according to claim 1, wherein a tightening allowance ratio (A/B), which is a ratio obtained by dividing a tightening allowance dimension (A) expressed as a difference between an inner diameter dimension upon mounting the lip seal on a sliding part and an inner diameter dimension before mounting the lip seal on the sliding part, by an inner diameter dimension (B) before mounting the lip seal on the sliding part, is 1% or more and 30% or less.

7. The lip seal according to claim 1, wherein a radial direction thickness of an innermost diameter part of the lip seal is 0.4 to 2 mm.

8. The lip seal according to claim 1, wherein an angle formed by an inner diameter surface which forms the sliding part and an apical surface of the lip seal in an axial cross section of the lip seal is 90 to 120°.

9. The lip seal according to claim 1, wherein the non-reinforcing filler material additionally contains zinc oxide.

* * * * *